June 22, 1943.        F. VON MADALER        2,322,489
SELECTIVE PROJECTOR AND SOUND REPRODUCER
Filed April 18, 1941        5 Sheets-Sheet 2

INVENTOR.
FERDINAND VON MADALER,
BY
ATTORNEY.

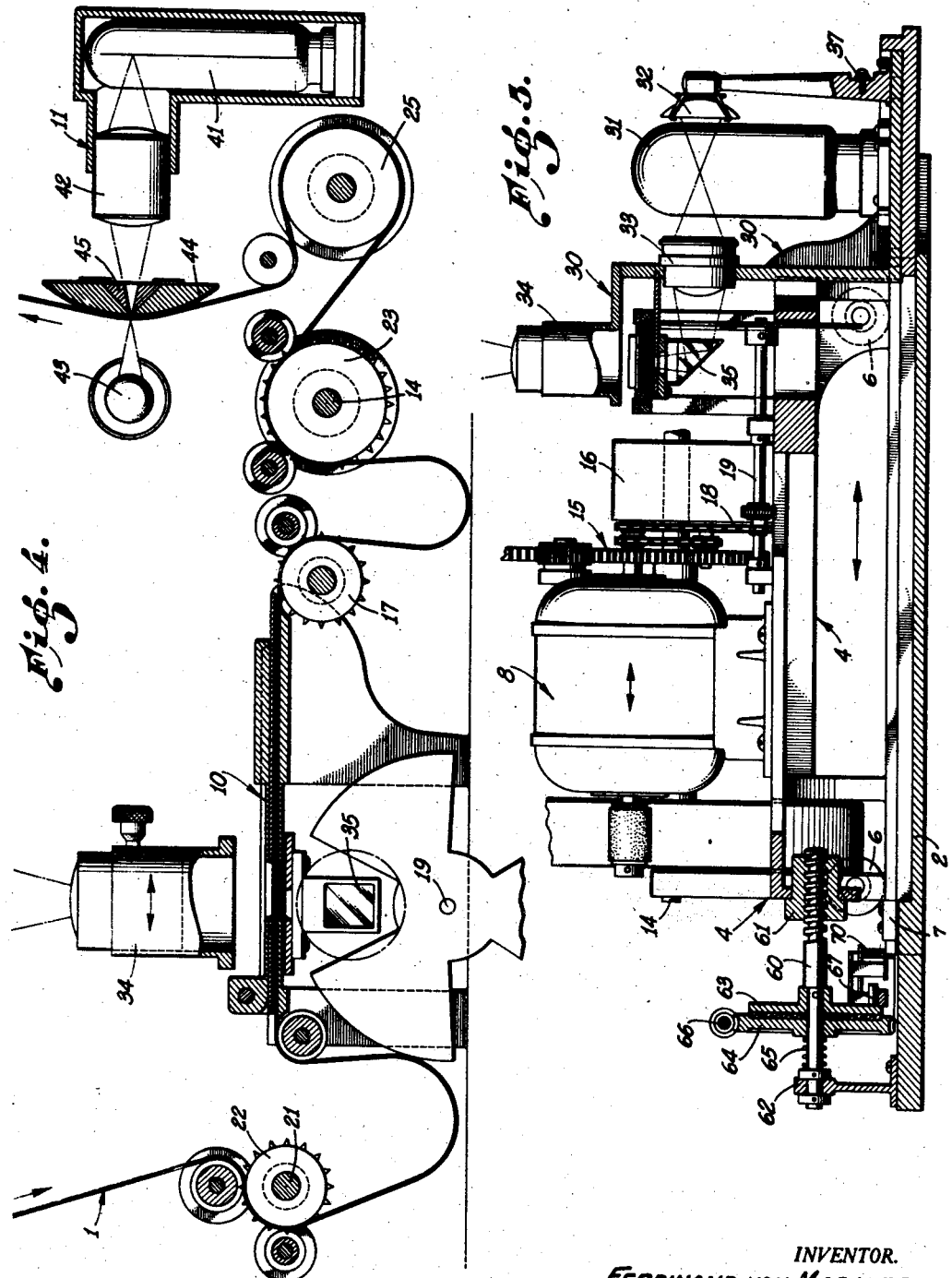

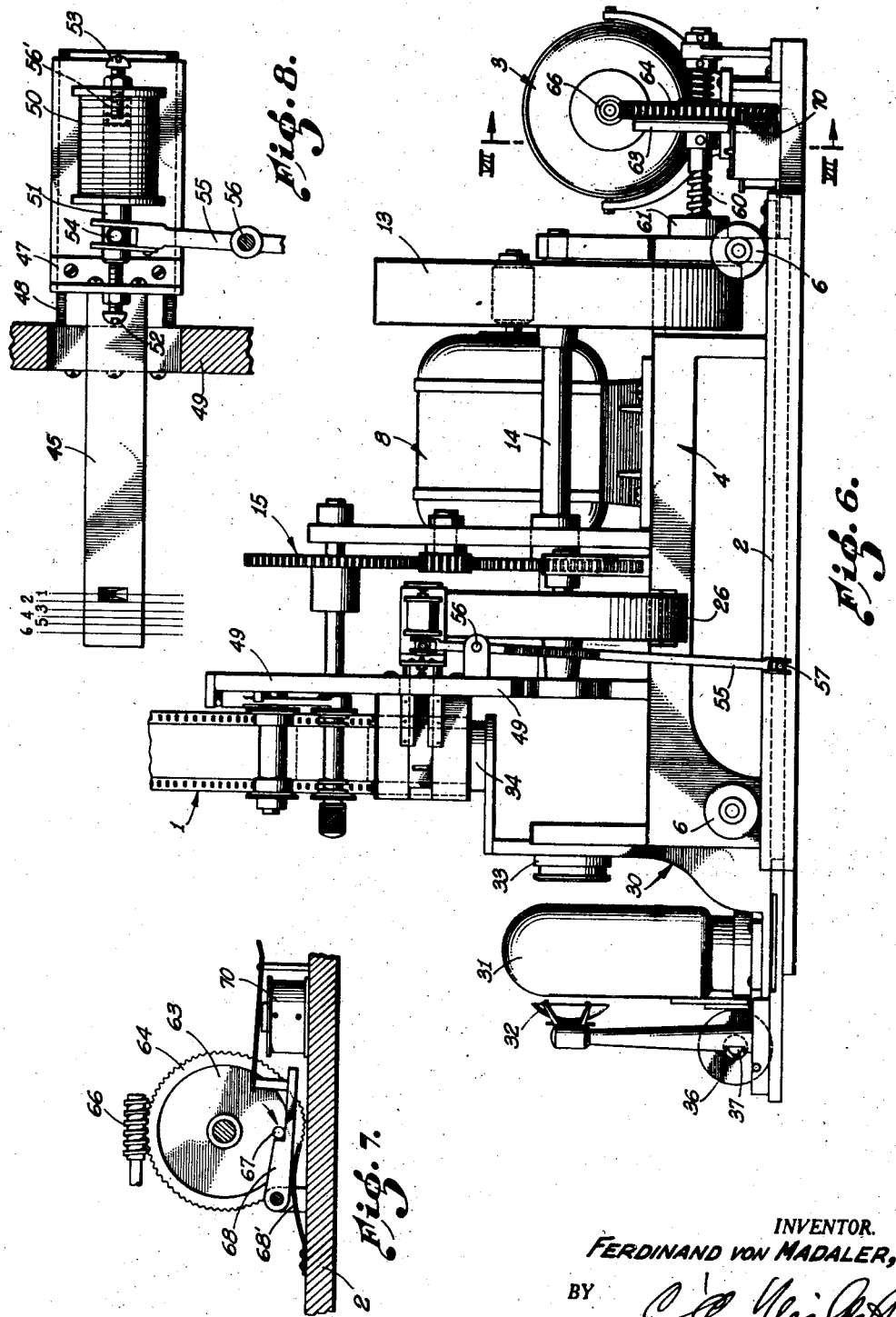

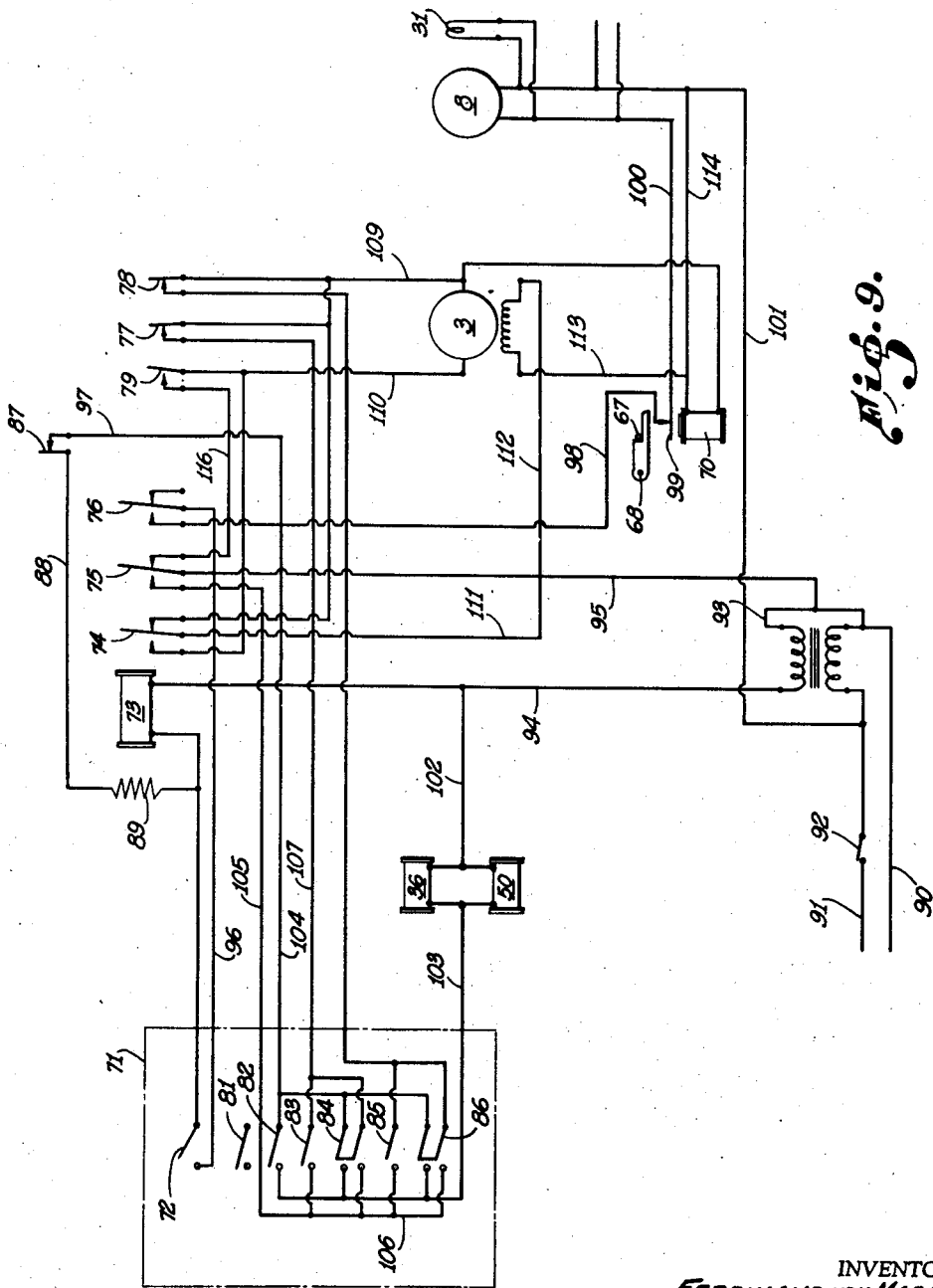

Patented June 22, 1943

2,322,489

UNITED STATES PATENT OFFICE 2,322,489

SELECTIVE PROJECTOR AND SOUND REPRODUCER

Ferdinand von Madaler, Los Angeles, Calif.

Application April 18, 1941, Serial No. 389,182

9 Claims. (Cl. 88—16.2)

This invention pertains to a compact, simple and efficient entertainment device adapted to project motion pictures and reproduce sound in synchronism with the projection of motion pictures, the device being characterized by its ability to project and reproduce selectively any desired motion picture carried upon film contained in the machine. The invention is also directed to a novel combined motion picture and sound record film, said film bearing a plurality of separate motion pictures and their corresponding sound recordings. Moreover, although the device described hereinafter is particularly designed for use as a coin-operated machine for use in cafes, restaurants, etc., the apparatus may also be employed in the production and reproduction of motion picture films for use in theaters, in the home, etc.

Although prior workers in this field have previously disclosed coin-operated motion picture projectors including devices for reproducing sound in synchronism with the pictures, they have not provided means whereby the operator could select a desired subject and have that particular subject reproduced. The present invention permits preselection to take place, so that the operator is not obliged to see and listen to a given subject or to whatever subject matter is at that moment in position for reproduction through the unit.

Moreover, the prior devices have required long lengths of film, rendering the devices bulky and unsatisfactory. The present invention contemplates a novel arrangement of motion pictures and sound recordings upon a single strip of continuous film whereby relatively long lengths of film are available for sound track purposes (thereby permitting more accurate and better sound reproduction), whereas the total length of film employed for a given motion picture is appreciably shorter than the total length of film employed for a corresponding sound recording.

An object of the present invention, therefore, is to disclose and provide a novel arrangement of motion pictures and sound recordings upon a strip of film. A further object is to provide a simple, inexpensive and foolproof mechanism whereby any desired motion picture out of a number carried by a single strip of film may be exhibited and a corresponding sound record reproduced.

Other objects, advantages and uses of the invention will become apparent from the following description of an exemplary form of the invention. In order to facilitate understanding, reference will be had to the appended drawings, in which:

Fig. 4 is a partly diagrammatic representation through the film advancing, projecting and pickup devices embodied in the apparatus.

Fig. 5 is a longitudinal vertical section taken along plane V—V of Fig. 2.

Fig. 6 is a side elevation.

Fig. 7 is a transverse section taken along plane VII—VII of Fig. 6.

Fig. 8 is an enlarged side view of the sound mask and its actuating mechanism.

Fig. 9 is a wiring diagram showing the circuit employed in selectively operating the apparatus.

It is to be understood that the apparatus hereinafter described may be contained in a suitable case or housing of any desired size or configuration. A portion of the wall of such housing will be made of frosted Celluloid, glass or other translucent material upon which the motion pictures may be projected for exhibition. Suitable amplifying and sound reproducing equipment will also be contained within such housing. A coin slot and a series of selector buttons will also be carried by the housing or in a remote control box so as to permit an operator to select a desired motion picture and energize the machine. Obviously the description given hereinabove is applicable to all uses of the devices embraced by this invention which are directed to their use in cafes, etc. As previously stated, the device and the film may be employed for other purposes, such as advertising etc.

Figure 3:
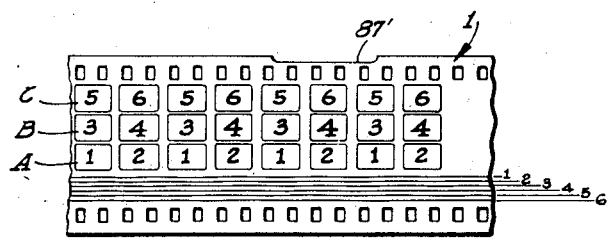
Fig. 3 is a plan view of a portion of film adapted for use in the apparatus.

The mode of operation and purpose of the invention will become apparent more readily by first considering the type of film employed in the device. By referring to Fig. 3 it will be noted that the film 1 is provided with a plurality of longitudinally extending picture areas A, B and C. Each of these longitudinally extending picture areas carries two or more motion pictures. For example, the area A is shown carrying two sets of pictures, pictures No. 1 representing one motion picture, whereas the pictures bearing the numeral 2 represent a second motion picture, alternate frames of picture area A thereby constituting a series of motion pictures. Three instead of two motion pictures may be carried on a single picture area, if desired, a succession of triads thus forming the entire picture area A. In Fig. 3 the picture area B carries motion pictures 3 and 4, whereas picture area C carries the motion pictures 5 and 6. As a result, the single strip of film 1 carries six separate and distinct motion picture subjects.

Upon the same strip of film 1 and adjacent the picture areas A, B and C, six sound tracks or sound records are shown identified by the numerals 1 to 6 inclusive.

It is to be noted that the bases of the individual pictures shown in Fig. 3 are parallel to the longitudinal edge of the strip film 1, although the bases may be transverse to the film. Each of the sound recordings, such as the sound recording 1, extends substantially the length of the entire film. This length exceeds the length of a motion picture such as the motion picture 2, since the longitudinal length of a film in a given picture area, such as area A, not only includes the motion picture 2 but also includes the motion picture 1.

Generally stated, the apparatus to which this invention is directed includes a stationary base and a carriage movable on such base. The film advancing mechanism is mounted upon the carriage and is designed to pass a film in front of a projector and in operative relation to a photoelectric or other reproducing pickup. The projector is provided with a mask at the projection gate whereby only one of the pictures may be projected at a given time. Means are provided to move the carriage with respect to the mask in such manner that any desired series of pictures may be caused to be projected, thereby bringing that portion of the film bearing the desired pictures into projection relationship with the gate and projection apparatus. Concurrently with the movement of the carriage to bring the picture into proper projection relation with the projection assembly, masking means uncovers the corresponding sound track, so that when it is desired to project motion picture No. 3, for example the film is moved so that pictures 3 cooperate with the projection assembly and the sound mask uncovers sound recording 3 so as to permit the pickup to only reproduce the sound track correlated with the motion picture 3.

The apparatus, preferably mounted on a base 2, is provided with a selector motor 3. A carriage, generally indicated at 4, is movably supported upon the base 2 and in the form of device illustrated, the carriage 4 is mounted upon rollers 5 and 6 cooperating with guide rails formed in the base 2. Adjustable stop means 7 may be carried by the base for the purpose of stopping the carriage at its inner limit of travel.

Figure 2:
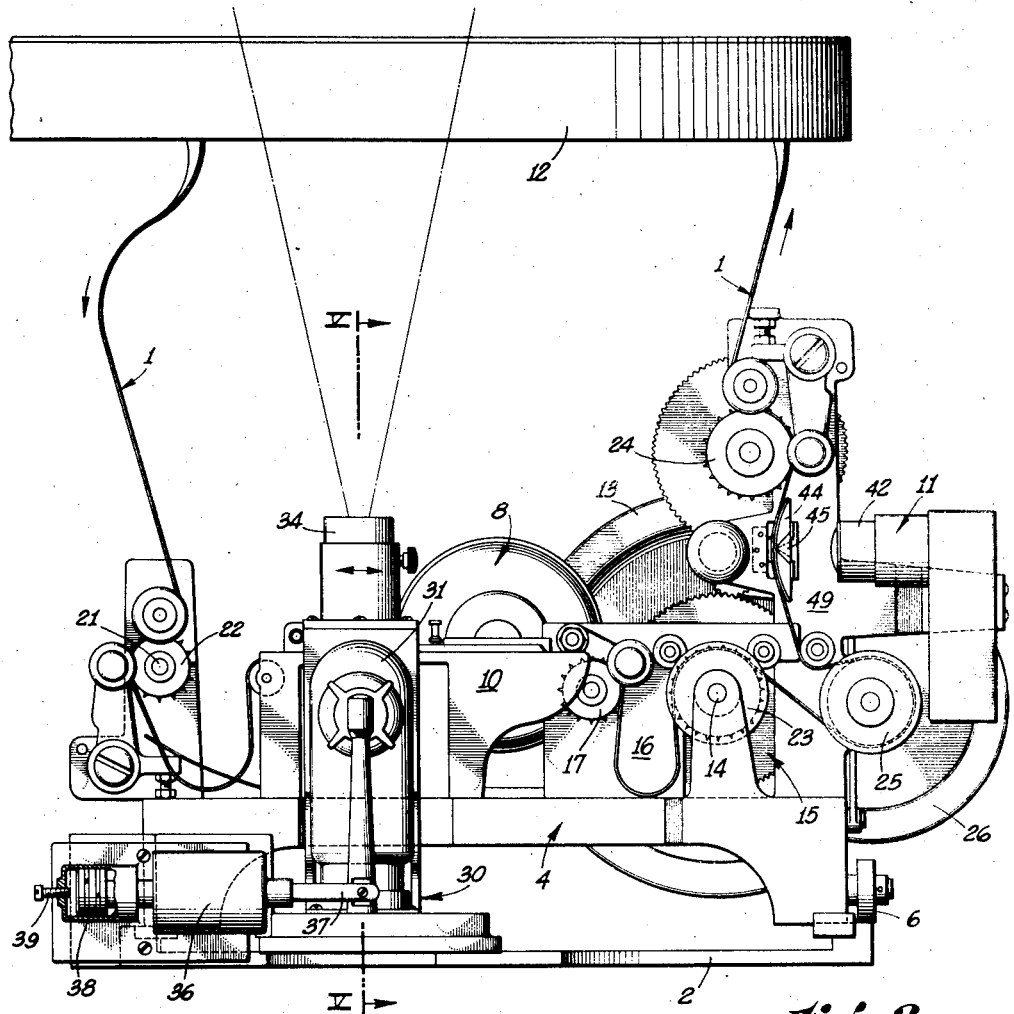
Fig. 2 is an end elevation.

The carriage 4 is provided with a driving motor 8 adapted to move the film 1 through a picture projection gate generally indicated at 10, and also into operative relation with a photo cell or pickup 11. The film 1 may, as previously stated, be in the form of a continuous loop fed into and out of a housing or reel 12 (see Fig. 2).

Various driving connections between the motor 8 and the film 1 may be employed. In the form of apparatus shown, the motor 8 drives a fly wheel 13 by frictional contact therewith. The fly wheel 13 is mounted upon a shaft 14 carrying gearing, generally indicated at 15, by means of which continuous motion may be transmitted to the sprocket 24 (Fig. 2) and to the sprocket 23. The motor 8 may also be provided with a driving connection 18' leading to the shaft 16' of the intermittent movement 16. The gearing 15 may interlock with the shaft 16' and thereby tie the intermittent movement and the continuously driven sprockets to each other so as to prevent any undue displacement therebetween. The motor 8 may also drive as by chain 18 the shutter shaft 19 and the chain 20 may be used in driving shaft 21 and sprocket 22.

The intermittent movement 16 is designed to advance the film 1 intermittently between projection apparatus a distance sufficient to permit sequential projection of a desired series of pictures constituting a photoplay.

That portion of the film 1 continuously moved between sprockets 23 and 24 may pass over a spool 25 mounted upon a shaft carrying the fly wheel 26. This fly wheel is frictionally driven by film passing over the spool or pulley 25. The pulley 25 and its correlated fly wheel prevent sprocket flutter from undesirably affecting that portion of the film which continuously moves past the reproducing pickup 11. It is to be understood that a suitable loop of film is maintained between the constantly driven sprockets and the intermittently driven sprockets.

The projection assembly may be mounted upon a standard 30 and include a light source 31, reflector 32, lens 33 and a projection lens 34. Light from the source 31 may be directed upon a prism or mirror surface 35 carried by the standard 30 so as to direct the light through one of the frames of the film 1 upwardly into the projection lens 34. The image thus projected may be reflected by another mirror, not shown, onto a viewing screen.

It will be evident that if the standard 30 is assumed to be stationary, whereas the carriage 4 is movable in a direction transverse to the direction of the movement of the film, then film 1 may be brought into position to project motion pictures 1, 3 or 5 (assuming that the projection assembly is in starting position for series or motion picture 1). In order to permit the projection of motion pictures 2, 4 or 6, the carriage 4 will have to be moved transversely as well as laterally. Means for moving the carriage 4 transversely may be provided, but in the embodiment shown, the entire standard 30 and the projection assembly carried thereby is moved transversely to the movement of the carriage 30 by means of a solenoid 36, which actuates an arm 37 connected to the standard 30 (in the particular instance shown, to that portion of the standard which supports the reflector 32). A dash pot 38 may be associated with the arm 37 for the purpose of preventing jarring of the light source and optical system. The dash pot 38 is shown provided with an adjustable bleeder 39. The solenoid 36 and its appurtenances are firmly fixed to the base 2. A spring 40 may be used for insuring return of the standard 30 and projection assembly to the initial position.

The reproducing pickup generally indicated at 11 is also firmly attached to the carriage 4 and may include a light source 41, a lens 42 and a photoelectric or other responsive device 43. The film may be caused to pass over a curved member 44 provided with a reproducing slot adapted to expose all of the sound tracks carried by the film. A movable selector mask 45 having a slit equivalent to the width of but one sound track is slidably mounted in operative relation to the slitted surface 44 for the purpose of selectively exposing a desired track to the pickup device. The selector mask 45 is attached to a frame 47 movable upon a keyway 48 which is firmly held by a standard 49 extending from the carriage 4. Carried by the frame 47 is an electromagnetic coil 50 and movably positioned within the coil 50 is an armature pin 51. The movement of the pin 51 may be controlled by a limit screw 52 attached to the frame 47 and by another limit screw 53 atached to the opposite end of the coil 50. The armature pin 51 is provided with a lug or extension 54 grasped by the bifurcated end of an actuating lever 55 pivoted at 56, the lower end of the lever 55 extending downwardly so as to engage a pin 57 carried by the base 2. Movement of the carriage 4 thereby causes the lever 55 to pivot at 56 and move the armature 51 into contact with stop screw 52 and thereby move the selector mask 45.

By again referring to Fig. 3, it will be noted that the centers of pictures 1 and 3 are spaced a greater distance than the corresponding sound tracks 1 and 3. This difference in movement must be taken into consideration in placing the pivot 56. Moreover, it is to be noted that in the event it is first desired to reproduce motion picture 1 and then it is desired to reproduce motion picture 2, no lateral movement of the carriage 4 is necessary, but it is necessary to shift the selector mask 45 so as to cause the pickup to reproduce sound track 2. When it is desired to move the mask 45 without moving the carriage 4, coil 50 is energized and moves bodily, thereby moving the frame 47 and selector mask 45 until the armature pin 51 contacts the stop screw 53. During such movement the armature pin 51 is stationary, since it is held rigid by the bifurcated end of lever 55. At the end of such movement the end of stop screw 52 would have moved away from the opposing end of armature pin 51, so that in the event the third motion picture, No. 3, is to be reproduced and the carriage moves into position, lever 55 will first move the armature pin into contact with stop screw 52 before then moving the frame 47 and selector mask 45 into operative relation with sound track 3. The spring 56' returns the armature to its original position when the solenoid is deenergized.

Movement of the carriage 4 is accomplished by means of an externally threaded driven member 60 cooperating with an internally threaded nut 61 attached to the carriage 4. The driven member 60 is journaled in a bearing 62. The driven member 60 may be provided with a disc 63 having a friction face in contact with a spiral gear 64 journaled on the driven member 60 and held against the friction disc by means of a spring 65. The spiral gear 64 is driven by a worm 66 which is driven by the selector motor 3. The disc 63 may be provided with a pin 67 adapted to engage a pivoted detent 68 mounted upon the base 2. The detent 68 may be caused to move down and to release the pin 67 under the influence of a relay 70.

The operation of the device may now be best understood by considering the operating circuit and wiring diagram shown in Fig. 9. In Fig. 9 the selector motor 3 is shown as a series wound alternating current motor capable of being reversed by change in the direction of current supplied to the armature in relation to the field coils. Relay 70 is shown in operative relation to the detent 68 for locking the driven member. Relays or solenoids 36 and 50 are indicated, these actuating the projection assembly and selector mask on the pickup respectively.

Figure 1:
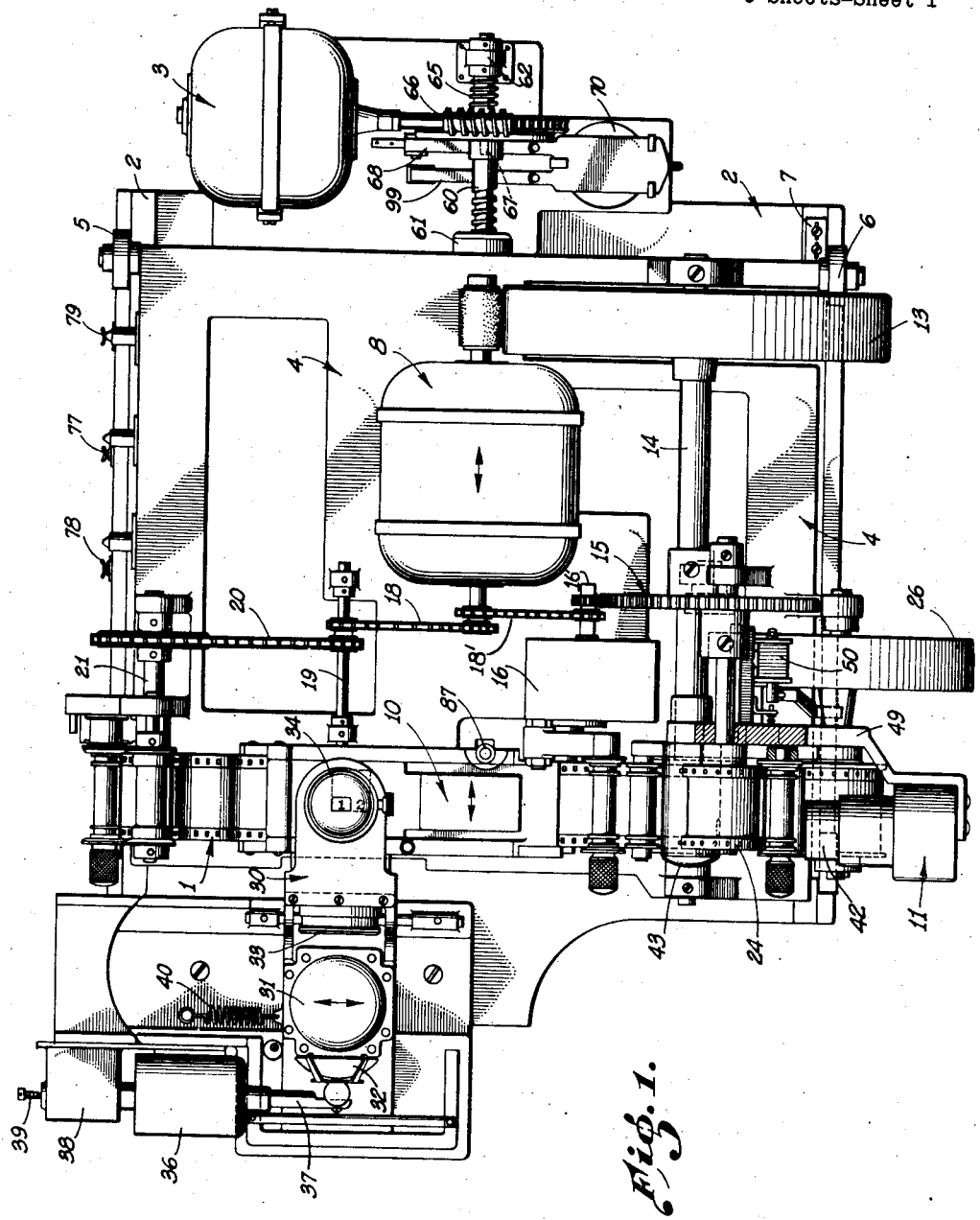
Fig. 1 is a plan view of one form of the mechanism.

Since the device should be capable of operation from a remote control, dotted lines 71 indicate the control buttons and coin chute which may be positioned at any remote control point or on the housing of the device. A coin-actuated switch is indicated at 72. Switches 81, 82, 83, 84, 85 and 86 are selector button switches adapted to cause the reproduction of motion pictures 1 to 6 respectively. A master relay 73 actuates three arms of a triple pole double throw switch having the elements 74, 75 and 76. Limit switches for limiting the travel of the carriage 4 are indicated at 77, 78 and 79 and are also shown in Fig. 1. A film cut-out switch is indicated at 87, and this switch, together with line 88 and resistance 89, constitutes a holding circuit for relay 73. Energy may be supplied by leads 90 and 91 through a master control switch 92 to a transformer having output lines 93 and 94. The lines 90 and 93 may be joined to form a phantom circuit involving line 95.

It is to be understood that when the device is at rest, that is in normal position, the carriage, projection assembly and selector mask are in position to project and reproduce motion picture No. 1. The film 1 near the end of the motion pictures carried by such film is provided with a notch 87' (Fig. 3) which is adapted to cooperate with the movable element of switch 87, thereby opening the switch 87 and breaking the holding circuit involving line 88 and resistance 89 and causing the shifting relays to go back into the original position for projecting and reproducing motion picture No. 1.

If it is assumed that the apparatus normally returns to a position where picture No. 1 is shown, there is no need for a selector switch correlated with picture No. 1, but for practical purposes, such selector switch is indicated at 81. Also it is not connected to the circuit since there is no need for such switch other than the practical one that an operator will want to perform some act to assure the projection of picture No. 1. If, therefore, the operator closes switch 81 and then introduces a coin into the chute, the switch 72 will be closed momentarily. Current will then flow through the master relay 73 by way of line 94 and lines 95 and 96.

Fig. 9 shows the switches 74, 75 and 76 in their normal position, but as soon as the relay 73 is energized, the arms move toward the left, opening the contacts now shown closed and closing the contacts on the left of the movable arms. The relay 73 is maintained in energized condition even though the coin has left switch 72 by reason of the holding circuit involving resistance 89, line 88 and switch 87, current being supplied to the relay by line 94, then through the holding circuit, line 97, switch 76 and line 95. Simultaneously, the closing of switch 76 supplies current to the motor 8 and projector light 31, current flowing from line 90 to line 95 and through switch 76 and line 98 through switch 99 and line 100 to the motor, the return line being indicated at 101.

When the movable arm or roller of switch 87 engages the notch 87' in the edge portion of the film 1 (at the end of the motion picture being projected) the switch 87 will open, thus breaking the holding circuit associated with the master relay 73 and permitting the switches 74, 75 and 76 to return to the initial position shown in Fig. 9. In such position, current supply to the motor 8 is broken and the film comes to rest. It is to be understood that a short length of leader connects the two ends of the continuous loop of film 1.

When it is desired to project motion picture 2 selector switch 82 is closed and when a coin is introduced so as to close switch 72, the holding master relay 73 is again energized so as to actuate the triple pole, double throw switches 74, 75 and 76, and the holding circuit is energized. When selector switch 82 is closed, however, then it will be noted that relays 36 and 50 are energized, these relays being supplied with current by lines 94, 102, 103 through switch 82 and line 104, switch 76 and return lines 95 and 93. Energization of relay or coil 36 will move the entire projection assembly into position to permit the projection of motion picture No. 2, whereas energization of the coil 50 moves the selector mask 45 into position above sound track 2. When, at the end of the film, the movable contact 87 again enters the cut-out 87' in the edge of film 1, the switch 87 is opened, breaking the holding circuit, opening switch 76 and thereby de-energizing the relays 36 and 50, discontinuing the supply of current to the projection motor 8 and permitting the projection assembly to return to initial position by reason of spring 40.

When the operator desires to project motion picture No. 3, selector switch 83 is closed and when the coin-actuated switch 72 is momentarily closed, master relay 73 is again energized and the holding circuit energized. Current is also supplied to the selector motor 3 by line 95 through switch 75, lines 105 and 106, switch 83 and the line 107, limit switch 77 and line 109 to the motor 3, the return circuit including line 110, line 111, switch 74, line 112, the field coil of the motor, line 113 and lines 114 and 101. Relay 70 is also energized, thereby unlocking the detent 68 so as to permit the motor 3 to impart rotation to disc 63 and driving shaft 60. At the same time, switch 99 is opened, thereby breaking the circuit to the driving motor 8 and preventing the projector from being operated while the carriage 4 is being moved by the selector motor 3. Limit switch 77 will be opened by moving carriage 4 when the carriage approaches the desired position and the supply of current to the motor 3 will be discontinued. Simultaneously, relay 70 is de-energized, permitting the detent 68 to move upwardly under the influence of spring 68' (Fig. 7) so as to engage the stop pin 67 and positively stop the carriage in proper position. Switch 99 is also simultaneously closed so as to energize the driving motor 8 and the projection lamp 31. When the projection of picture No. 3 has been completed, switch 87 opens, releasing the holding circuit and thereby returning switches 74, 75 and 76 to initial position. Current will still be supplied, however, by line 95 through switch 75, line 116, switch 79 and line 110 to the selector motor 3, but it is to be noted that the direction of the flow of current through the motor armature is now reversed so that the motor is driven so as to return the carriage to its initial position. As soon as the carriage returns to initial position, limit switch 79 automatically opens, stopping the rearward progress of the carriage in its initial starting position. Similar operations take place when selector switches 84, 85 and 86 are closed.

It will be understood by those skilled in the art that numerous changes and modifications may be made from the particular form of apparatus shown in the drawings without departing from the inventive concept herein disclosed. Although Fig. 3 shows all of the picture areas A, B and C in adjacent relationship whereas the corresponding sound tracks occupy a common longitudinally extending area, the present invention contemplates the placement of a plurality of motion pictures in each picture area, the various picture areas being then spaced by longitudinally extending sound tracks, pictures and sound tracks in alternate relation extending transversely across the film strip.

The device of this invention permits the projection of a plurality of motion pictures without changing the position of the projected pictures with respect to the frame lines of a stationary screen by providing means whereby any desired projection portion of a film strip may be brought into projection relationship with a stationary projection assembly.

I claim:

1. A combined picture projector and sound reproducer, including: a stationary base; a movable carriage on said base; a continuous reel of film provided with a plurality of longitudinally extending, transversely adjacent picture areas, said film also carrying a plurality of longitudinally extending sound recordings corresponding in number to the number of motion pictures on said film, said sound recordings being in parallel relation to each other adjacent one edge of the film; a reproducing pickup on said carriage; a motor operably associated with a film moving means mounted on said carriage and adapted to move film from said reel and through said reproducing pickup; a stationary projector assembly in operative relation with film on said film moving means; motor means for moving the carriage to place a desired longitudinally extending picture area in projecting relation to the projector assembly; movable masking means in operative relation to the reproducing pickup and means for moving said masking means in timed relation to the movement of said carriage to selectively reproduce the sound record corresponding to the selected picture area, the extent of movement of the masking means being smaller than the extent of movement of the carriage.

2. A combined picture projector and sound reproducer, including: a stationary base; a movable carriage on said base; a continuous reel of film provided with a plurality of transversely adjacent, longitudinally extending picture areas, said film also carrying a plurality of sound recordings corresponding in number to the number of motion pictures on said film, said sound recordings being parallel to each other adjacent one edge of the film; a reproducing pickup on said carriage; a motor operably associated with a film moving means mounted on said carriage and adapted to move film from said reel and through said pickup; a stationary projector assembly in operative relation with film on said film moving means; motor means for moving the carriage to place a desired longitudinally extending picture area in projecting relation to the projector assembly; movable masking means in operative relation to the pickup; means for moving said masking means in timed relation to the movement of said carriage, means for controllably reducing the extent of movement of the masking means to an extent smaller than the extent of movement of the carriage, to selectively reproduce the sound record corresponding to the selected picture area; and an electrical circuit including a coin-operated switch and a plurality of selector switches corresponding to the laterally adjacent picture areas on said film for selectively energizing the carriage moving means and film moving means.

3. A combined picture projector and sound reproducer, including: a stationary base; a movable carriage on said base; a continuous reel of film provided with a plurality of transversely adjacent, longitudinally extending picture areas, said film also carrying a plurality of sound recordings corresponding in number to the number of motion pictures on said film, said sound recordings being parallel to each other and adjacent one edge of the film; a reproducing pickup on said carriage; a motor and a film moving means operably associated therewith, both being mounted on said carriage and adapted to move film from said reel and through said pickup; a picture projector assembly mounted on said base and extending into operative relation with film on said film moving means; motor means for moving the carriage in a direction transverse to the movement of film through said film moving means to place a desired longitudinally extending picture area in projecting relation to the projector assembly; movable masking means in operative relation to the pickup and means for moving the masking means in timed relation to the movement of said carriage to selectively reproduce the sound record corresponding to the selected picture area, said last named means including means for reducing the movement of the masking means to an extent smaller than the extent of movement of the carriage.

4. A combined picture projector and sound reproducer, including: a stationary base; a movable carriage on said base; a continuous reel of film provided with a plurality of transversely adjacent, longitudinally extending picture areas, said film also carrying a plurality of sound recordings corresponding in number to the number of motion pictures on said film, said sound recordings being parallel to each other and adjacent one edge of the film; a reproducing pickup on said carriage; a motor and a film moving means associated therewith, mounted on said carriage and adapted to move film from said reel and through said pickup; a projector assembly mounted on said base and extending into operative relation with film on said film moving means; motor means for moving the carriage in a direction transverse to the movement of film through said film moving means to place a desired longitudinally extending picture area in projecting relation to the projector assembly; movable masking means in operative relation to the pickup; means for moving the masking means in timed relation to the movement of said carriage to selectively reproduce the sound record corresponding to the selected picture area and an electrical circuit including a coin-operated switch, a plurality of selector switches corresponding to the laterally adjacent picture areas on said film and limit switches opened by movement of the carriage for stopping the same, for selectively energizing the carriage moving means and film moving means and returning the carriage to initial position.

5. A combined picture projector and sound reproducer, including: a stationary base; a movable carriage on said base; a continuous reel of film provided with a plurality of laterally adjacent, longitudinally extending picture areas, said film also carrying a plurality of sound recordings corresponding in number to the number of motion pictures on said film; a pickup on said carriage; a film moving means on said carriage adapted to move film from said reel and through said pickup; a projector assembly on said base and extending into operative relation with film on said film moving means; motor means for moving the carriage transversely to the direction of movement of film thereon to place a desired longitudinally extending picture area in projecting relation to the projector assembly; means for moving the projector assembly in the direction of movement of the film on said carriage to place a given picture within a longitudinally extending picture area in projecting relation to the projector assembly; movable masking means in operative relation to the pickup for selectively reproducing a desired sound record and means for moving said masking means in timed relation to the movement of said carriage and projector assembly to selectively reproduce the sound record corresponding to the picture.

6. In a combined picture projector and sound reproducer, the combination of: a stationary base; a laterally movable carriage on said base, said carriage including a projection gate, a reproducing pickup, a motor and means, operably related to said motor, for intermittently moving film past said gate and continuously past said pickup in a direction transverse to the movement of the carriage; said reproducing pickup including a movable masking element, means for moving the masking element in timed relation to the movement of said carriage, the extent of movement of the masking means being smaller than the extent of movement of the carriage; a projection assembly mounted on said base and including a light source, a prism on one side of the film at said projection gate, a condenser lens between said light source and prism and a projection lens adapted to receive light from said prism.

7. In a combined picture projector and sound reproducer, the combination of: a stationary base; a laterally movable carriage on said base, said carriage including a picture projection gate, a reproducing pickup, a motor, and means associated therewith for intermittently moving film past said gate and continuously past said pickup in a direction transverse to the movement of the carriage; a projection assembly mounted on said base and including a light source, a prism on one side of the film at said projection gate, a condenser lens between said light source and prism and a projection lens adapted to receive light from said prism; means for selectively moving said carriage within predetermined limits toward and away from said projection assembly and means for moving the projection assembly in a direction transverse to the movement of the carriage.

8. In a combined picture projector and sound reproducer, the combination of: a stationary base; a laterally movable carriage on said base, said carriage including a projection gate, a reproducing pickup and means for intermittently moving film past said gate and continuously past said pickup in a direction transverse to the movement of the carriage; a projection assembly mounted on said base and including a light source, a prism on one side of the film at said projection gate, a condenser lens between said light source and a projection lens adapted to receive light from said prism, and a movable masking means operably associated with said reproducing pickup for selectively reproducing a desired sound record carried on said film and means for moving said masking means in timed relation to the movement of said carriage.

9. A combined picture projector and sound reproducer adapted to selectively project pictures and reproduce sound correlated therewith by transmission of light through a film provided with a plurality of longitudinally extending, transversely adjacent picture areas, and a plurality of longitudinally extending sound recordings in parallel relation to each other adjacent one edge of such film, including. a base; a movable carriage on said base, said carriage being provided with a picture projection gate, a reproducing pickup, means for intermittently moving film past said gate and continuously past said pickup in a direction transverse to the movement of the carriage, and a motor operably connected with said film moving means; a projection assembly mounted on said base and including a light source and a projecting lens, said projection assembly being in operative relation to the picture projection gate on said carriage; means for moving the projection assembly within predetermined limits in the direction of movement of the film; motor means for moving the carriage within predetermined limits; and a masking means mounted on the movable carriage in operative relation to the reproducing pickup, and means for moving the masking means when said projection assembly is moved.

FERDINAND VON MADALER.